US005816499A

United States Patent [19]

Christiansen

[11] Patent Number: 5,816,499

[45] Date of Patent: Oct. 6, 1998

[54] HIGH-PRESSURE CLEANER WITH A HOSE-CONNECTED CLEANING GUN

[75] Inventor: Keld Christiansen, Randers, Denmark

[73] Assignee: Kew Industri A/S, Denmark

[21] Appl. No.: 712,565

[22] Filed: Sep. 11, 1996

[30] Foreign Application Priority Data

Oct. 30, 1995 [EP] European Pat. Off. .............. 95117059

[51] Int. Cl.$^{6}$ ............................ A01G 25/09; B65H 75/00

[52] U.S. Cl. .......................... 239/198; 239/146; 239/195; 239/197; 137/355.12; 242/395; 242/403.1

[58] Field of Search .................................... 239/146, 195, 239/197, 198, 0, 273; 137/355.12, 355.26, 355.27; 138/153; 242/395, 403.1

[56] References Cited

U.S. PATENT DOCUMENTS

| | | | |
|---|---|---|---|
| 2,640,724 | 6/1953 | Sanders et al. | 242/403.1 X |
| 4,007,876 | 2/1977 | Stevenson | 239/74 X |
| 4,258,755 | 3/1981 | Higbee | 138/153 X |
| 4,767,534 | 8/1988 | Ziller . | |
| 4,777,976 | 10/1988 | Johnston et al. | 242/403.1 X |
| 4,967,960 | 11/1990 | Futrell . | |
| 5,303,866 | 4/1994 | Hawks, Jr. | 239/198 X |
| 5,429,306 | 7/1995 | Schneider et al. | 239/273 X |
| 5,526,848 | 6/1996 | Terashima et al. | 138/153 X |

FOREIGN PATENT DOCUMENTS

| | | | |
|---|---|---|---|
| 2603270 | 3/1988 | France . | |
| 3940543 | 6/1991 | Germany . | |
| 4237356 | 5/1994 | Germany . | |
| 2156644 | 10/1985 | United Kingdom | 239/198 |
| WO 93/09886 | 5/1993 | WIPO . | |

*Primary Examiner*—Andres Kashnikow
*Assistant Examiner*—Robin O. Evans
*Attorney, Agent, or Firm*—Larson & Taylor

[57] ABSTRACT

In a high-pressure cleaner (1) including a housing (4) running on wheels (6), a motor-pump unit (2,3) in the housing (4) and a high-pressure hose (13) connecting the high-pressure side (9) of the pump (3) with a cleaning gun (12), a hose accumulator (7), capable of storing the hose (13), is placed within the housing (4), the latter having a slot. (14) for the hose (13). Preferably, the hose accumulator (7) comprises a drum (not shown), on which the hose (13) may be wound by means of a hand crank (8).

7 Claims, 2 Drawing Sheets

HIGH-PRESSURE CLEANER WITH A HOSE-CONNECTED CLEANING GUN

TECHNICAL FIELD

The present invention relates to a high-pressure cleaner of the type having a high-pressure hose stored in a housing.

BACKGROUND ART

Various high-pressure cleaners of the type referred to above are known. Thus, the international patent publication No. WO 93/09886 discloses a high-pressure cleaner of the mobile, wheel-supported type, having means for storing the high-pressure hose when not in use. These means are constituted by two mutually opposing "hose hooks", between which the hose after having been coiled is placed and held in a figure-of-eight configuration. This arrangement does, however, suffer from the disadvantage that the hose has to be coiled by hand by the user. Apart from the obvious inconvenience to:the user, this arrangement increases the risk of the hose being kinked and/or twisted during the coiling, contributing to reducing the effective life of the hose.

DE-A1-3,940,543 discloses a high-pressure cleaner of the type comprising a trolley with a chassis with wheels and steering handle, in which the motor-pump unit is placed in the center of a drum, on which the low-pressure supply hose and possibly the power supply cable may )De stored. The high-pressure hose itself is coiled by hand by the user and is hung on a hose hook placed on the side of the chassis. This high-pressure cleaner is adapted for use in locations at long distances from the supply sources (water and electricity), thus presenting a need for a long low-pressure supply hose and a long power cable, that may be unwound at the same time as the user pushes the trolley towards the work site. Thus, with this arrangement no consideration has been given to a safe handling of the high-pressure hose, the latter partly being subjected to kinking and twisting due to the manual coiling, partly is stored in an unprotected state, even when the trolley is moved away from the work site, thus increasing the risk of the hose being subjected to external harmful physical or chemical influences, e.g. if it falls off the hose hook during the movement of the trolley. A further disadvantage is that the user, when winding and unwinding the low-pressure hose, has to turn both the drum and the built-in motor-pump unit, thus calling upon a great effort from the user.

DISCLOSURE OF THE INVENTION

It is the object of the present invention to provide a high-pressure cleaner of the kind referred to initially, with which it is possible to avoid the drawbacks in the previously known high-pressure cleaners referred to above, and this object is achieved with a high-pressure-cleaner, according to the invention additionally exhibiting the features set forth hereafter.

With this arrangement, the high-pressure hose will be protected against external harmful influences when not in use, and at the same time, the necessity of coiling the hose by hand and placing it on more or less unsightly hooks has been eliminated.

With the present invention, the forces acting upon the high-pressure cleaner in connection with the paying-out or hauling-in of the high-pressure hose will act upon the cleaner at a relatively low level, thus reducing the risk of toppling a high-pressure cleaner standing in the upright position.

The present invention ensures that especially the hauling-in of the hose takes place uniformly and with little risk of the hose being kinked or twisted.

The present invention makes it possible to control the winding and unwinding of the high-pressure hose with high accuracy.

Additional advantageous embodiments of the high-pressure cleaner according to the present invention, the effects of which are explained in the following detailed part of the present description, are set forth hereafter.

BRIEF DESCRIPTION OF THE DRAWINGS

In the following detailed portion of the present description, the invention will be explained in more detail with reference to the exemplary embodiments of a high-pressure cleaner according to the invention shown in the drawings, in which FIG. 1 in a simplified manner and partly cut open shows the most important components of the high-pressure cleaner together with associated equipment, and FIGS. 2*a*–2*c* diagrammatically show various possible embodiments of the placing of the hose accumulator.

DESCRIPTION OF THE PREFERRED EMBODIMENTS

Figure 1:
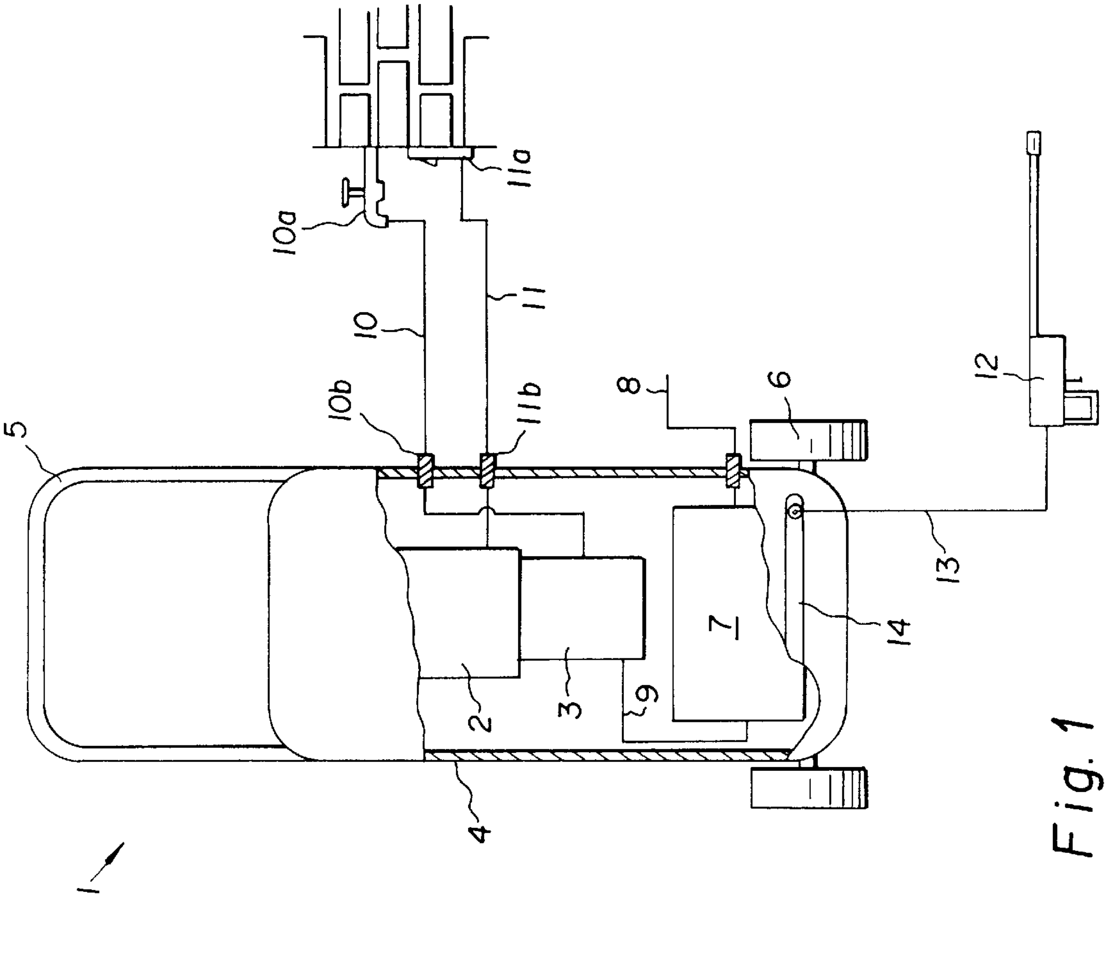

The high-pressure cleaner 1 in FIG. 1 being shown in a simplified and diagrammatic form and partly cut open, comprises the following main components:

- a motor 2, together with a pump 3 constituting the motor-pump unit of the high-pressure cleaner,
- a housing 4,
- a handle 5 and wheels 6 to make it easier to move the high-pressure cleaner 1, and
- a hose accumulator 7.

The motor 2, in the embodiment shown being electrically driven, is supplied with electric power from an ordinary electric power source 11*a* not shown in detail via a power cable 11, the latter extending directly or indirectly through the wall of the housing 4 by means of a simple lead-through or junction box 11*b*.

Further, the motor 2 is mechanically connected to the pump 3, that may be of any commonly used type, e.g. an axial-piston pump, on the suction side supplied with cleaning liquid, in the present case ordinary water via a water-supply conduit 10 connected to a water source 10*a*. Like the power cable 11, the water-supply conduit 10 may extend through the wall of the housing 4 directly or indirectly by means of a simple lead-through or coupling connector 10*b*.

The high-pressure side of the pump 3 is connected via a high-pressure conduit 9, preferably in the form of a piece of hose, to a coupling device (not shown) connected to one end of a high-pressure hose 13 in the hose accumulator 7. The other end of the high-pressure hose 13 is in the conventional manner connected to an ordinary cleaning gun 12 by means of another coupling device (not shown).

During use, i.e. during the normal operational condition, the high-pressure cleaner 1 is placed standing upright, and in the exemplary embodiment shown in FIG. 1, the hose accumulator 7 is situated close to the bottom part of the high-pressure cleaner 1, being further provided with a hand crank 8 for manual winding and unwinding of the hose 13, the latter leaving the housing 4 through a slot 14, in this exemplary embodiment being oriented transversely or horizontally.

Figure 2A:
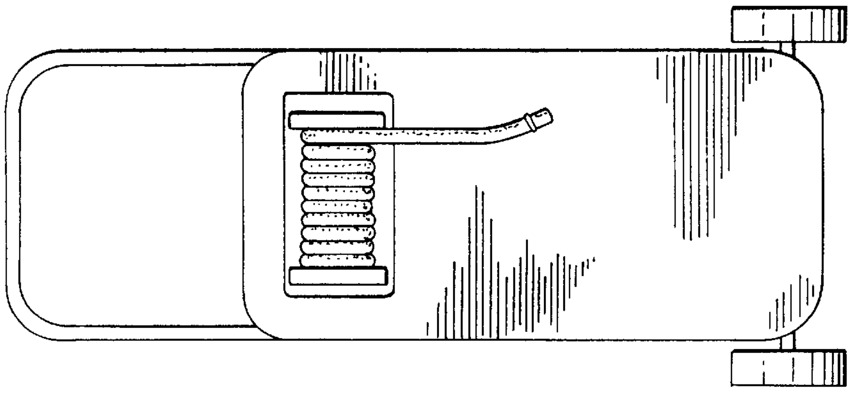
Figure 2C:
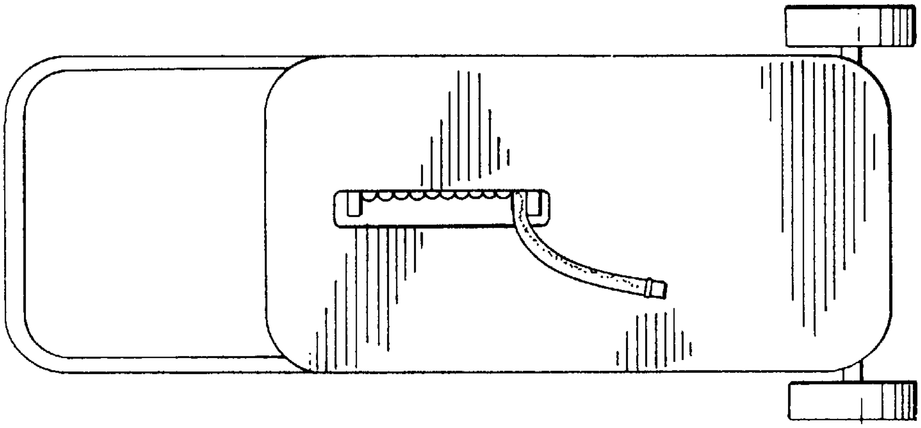
Figure 2B:
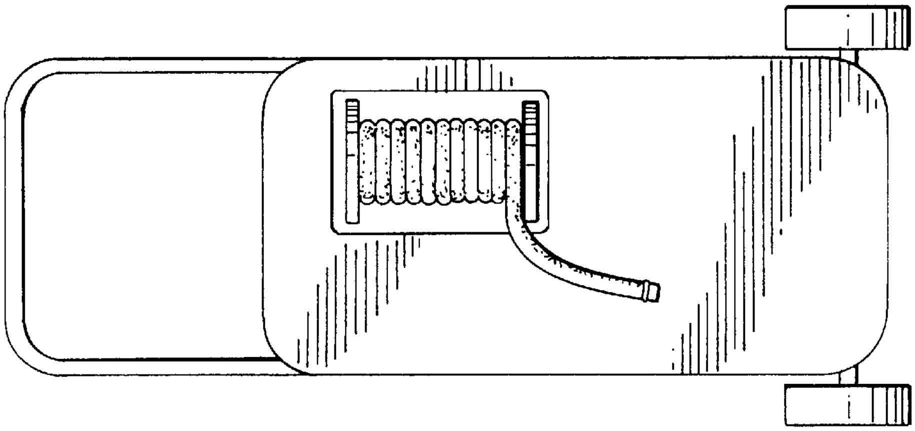

The placing of the hose accumulator 7 close to the bottom part of the housing 4 and below the motor-pump unit 2,3 constitutes one possible preferred embodiment, but the hose accumulator 7 may also be placed and oriented differently, e.g. as in the examples shown in FIGS. 2*a*–2*c* of the drawing. Thus, as shown in these FIGS. 2*a*–2*c*, the hose accumulator 7 may be fully or substantially enclosed by the housing 4. Likewise, the transverse orientation of the slot 4 as shown in FIG. 1 may be replaced by a e.g. longitudinally extending slot as shown in the FIGS. 2*a*–2*c*.

The embodiment, in which the hose accumulator 7 is fully enclosed, i.e. in its entirety placed within the housing 4, is the optimal embodiment, providing the most effective protection of the hose against external harmful influences when the high-pressure cleaner is not in use. The danger in having an unprotected high-pressure hose, as is the case in the cleaners known up to the present, is that the hose may be damaged in such a manner that the user does not discover the damage until the hose is put into use, i.e. when high-pressure is being applied to it. This may, of course, lead to quite serious consequences for the user, if the hose is e.g. partially cut through and bursts when the user starts the high-pressure cleaner.

Further, the placing of the hose accumulator 7 fully or partly internally in the housing 4 provides the very obvious advantage that the hose 13 under all conditions, especially when being fully wound on the accumulator drum, does not "drift about" and so constitutes a risk, especially for persons being present in the area around the high-pressure cleaner, such as is the case with the hose-storage devices known up to the present. Likewise, in the previously known high-pressure cleaners, the hose may inadvertently either fall down from the supporting hooks in its entirety or unwind itself partially from the latter, hence constituting a corresponding risk.

In order to additionally achieve a winding and unwinding of the hose 13, that is as homogeneous as possible, the hose accumulator 7 may further be provided with a hose-guiding device (not shown) causing the hose to be wound and unwound according to a predetermined pattern.

The hose accumulator 7, which is not shown in detail, comprises a drum, on which the hose 13 may be wound, the requisite fittings for securing the accumulator to the housing, as well as one or two bearings for supporting the drum for rotation at one side or both sides, of which at least one bearing functions as a coupling device between the high-pressure hose 13 and the high-pressure conduit 9 of the pump 3. The bearing concerned may be constructed with e.g. a rotating hose connector for the high-pressure hose, and further with e.g. a sealing ring for providing a seal between the connector and the hose.

As will be seen from the above description, the high-pressure cleaner according to the present invention is relatively compact and will—all else being equal—occupy less space both during stationary storage and during e.g. transportation with a vehicle, such as an automobile or the like, than the previously known high-pressure cleaners with externally supported hose.

In the exemplary embodiment shown, the drum in the hose accumulator 7, on which the hose 13 may be wound, is operated by means of a hand crank 8, but it also lies within the scope of the present invention to replace or supplement this hand crank with a fully or partly automatic electrically or hydraulically driven winding and unwinding mechanism.

The high-pressure hose 13 is preferably made from hose material of the type consisting of a fluid-tight matrix of rubber or rubber-like material reinforced by helically wound and/or braided wires or filaments having a high tensile strength. A hose made of such a material has proved to be sufficiently flexible to be wound on and unwound from the accumulator drum without difficulty, at the same time being capable of withstanding the high pressures involved.

I claim:

1. High-pressure cleaner comprising:

a motor-pump unit which produces a high pressure cleaning liquid at a high pressure side thereof, a housing in which said motor-pump is located, a cleaning gun, a high-pressure hose which connects said cleaning gun to the high pressure liquid produced by said motor-pump unit, said high-pressure hose being made of hose material consisting of a fluid-tight matrix of rubber or rubber-like material reinforced by helically wound or braided wires or filaments having a high tensile strength, a hose accumulator for said high-pressure hose placed wholly inside of said housing and adapted for paying-out and hauling-in said hose, an opening in said housing through which said hose extends from said accumulator to the outside of said housing.

2. High-pressure cleaner according to claim 1, characterized in that said hose accumulator (7) is placed in the lower part of said housing (4) below said motor-pump unit (2,3).

3. High-pressure cleaner according to claim 1, characterized in that said opening constitutes a slot extending in the transverse or longitudinal direction of said housing, said slot having an opening width much smaller than a corresponding dimension of said accumulator taken in the same direction as the opening width.

4. High-pressure cleaner according to claim 1, characterized in that said hose accumulator (7) is of the type comprising a rotatable drum, on or from which said hose (13) can be wound or unwound, respectively.

5. High-pressure cleaner according to claim 4, characterized in that a bearing supporting said drum for rotation constitutes a fluidic connecting device connecting the proximal end of said hose (13) to the high-pressure side (9) of said pump (3).

6. High-pressure cleaner according to claim 4, characterized in that said hose accumulator (7) comprises a hose guide adapted to reciprocate during the rotatory movement of said drum.

7. High-pressure cleaner according to claim 4, characterized in that said drum is connected to a manually operable member (8), with which it can be made to rotate in either direction.

* * * * *